(No Model.)
J. H. HAMILTON.
WATER CLOSET.
No. 541,274. Patented June 18, 1895.
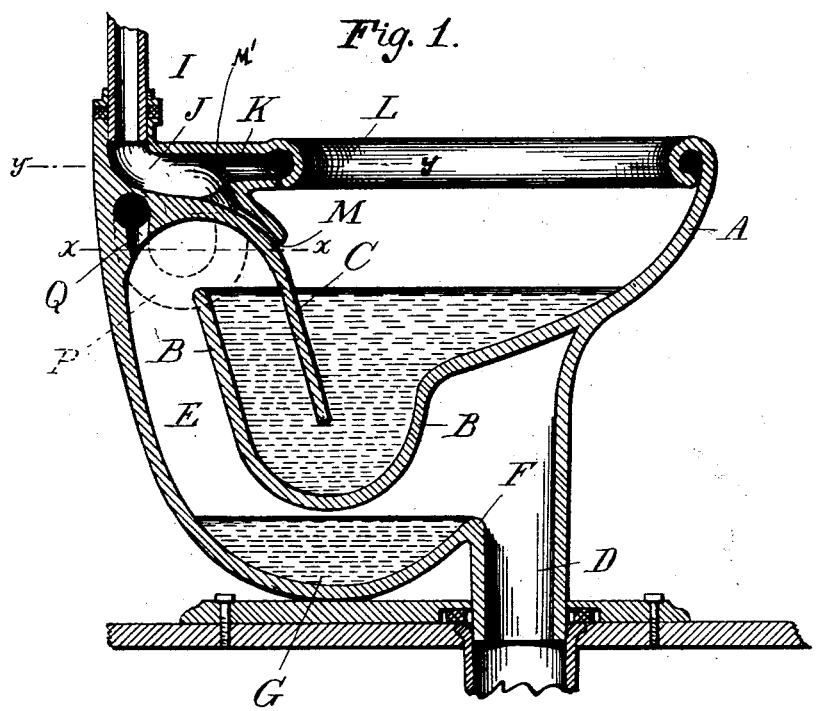
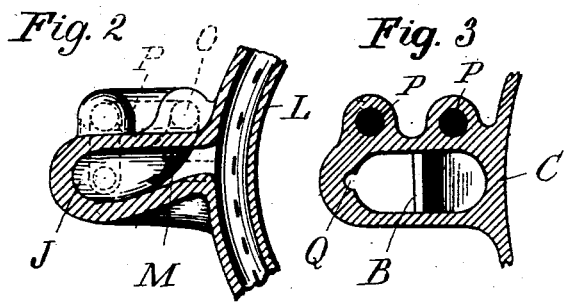 
Witnesses:
Otto Barthel
P. M. Hulbert
Inventor:
John H. Hamilton
By Sprague & Son
Attys.

UNITED STATES PATENT OFFICE.

JOHN H. HAMILTON, OF DETROIT, MICHIGAN.

WATER-CLOSET.

SPECIFICATION forming part of Letters Patent No. 541,274, dated June 18, 1895.

Application filed August 23, 1892. Serial No. 443,930. (No model.)

*To all whom it may concern:*

Be it known that I, JOHN H. HAMILTON, a citizen of the United States, residing at Detroit, in the county of Wayne and State of Michigan, have invented certain new and useful Improvements in Water-Closets, of which the following is a specification, reference being had therein to the accompanying drawings.

This invention relates to new and useful improvements in siphon water closets, and the invention consists in the peculiar construction, arrangement and combination of the various parts, whereby the flushing is accomplished with a minimum of water, and whereby the siphon is quickly and positively established to obtain the best results, all as more fully hereinafter described.

In the accompanying drawings, Figure 1 is a vertical central section through a water-closet embodying my invention. Fig. 2 is a section on line $y\,y$, Fig. 1. Fig. 3 is a section on line $x\,x$, Fig. 1.

A is the bowl in which is the wall B forming the bottom of the bowl, a depending wall C forming with the curved bottom a trap.

D is the soil pipe and E is the passage between the rear wall of the bowl and the rear of the wall B, leading to the soil pipe.

F is a raised lip at the point of juncture between the soil pipe and passage E (or at any other suitable point in the passage), this lip being of a height slightly lower than the bottom of the wall B, forming a bowl G in which the water is trapped, leaving a restricted normally open air passage to the soil pipe over the bowl. This restriction is such that when the water flows into the bowl G, the overflow from the bowl and the water from the jet close the passage, and make an auxiliary trap to assist in starting and maintaining the siphon in the passage E during the operation of the closet.

I is the flushing pipe from any source of water supply. It enters into a chamber J at the top of the bowl, and communicates with a passage K leading to the apertured rim L, and with a passage M discharging over the wall C, and with a passage O, which has the trap P formed therein, and discharges by a restricted aperture Q into the top of the passage way or vacuum chamber E.

By forming the aperture K at the point indicated above the opening M a wall or dam M' is formed which is inclined toward and terminates at the mouth of the trap P. By this means the after fill is conducted directly into the bowl, and prevented from entering the passage K.

The parts being thus arranged as described their operation is as follows: To flush the closet, water is admitted through pipe I under pressure, into the chamber J, whence it flows through the perforated rim L and passage M to wash and fill is the bowl, and simultaneously the water passes through the passage O and trap P and discharges in a jet through the aperture Q into the passage E driving the air out, overflowing the bowl G and forming the trap therein. This remains sealed until the water ceases flowing into the chamber E. The vacuum in the chamber E causes the water to flow from the bowl. As soon as the water ceases flowing, the seal of the overflow trap is broken, and the water is maintained at the proper level therein. The trap P and the trap in the bowl prevent the gases from the soil pipe entering the room.

What I claim as my invention is—

A water closet bowl consisting of an integral bowl formed with a flushing ring, a fill opening, a dam M' between the fill opening and flushing ring, an opening for the water supply, a trap P leading out from the water passage at the dam and on the plane of the mouth of the fill opening, a siphon at the rear of the bowl, a discharge passage into which the siphon and trap P lead, and a false trap at the end of the passage, substantially as described.

In testimony whereof I affix my signature in presence of two witnesses.

JOHN H. HAMILTON.

Witnesses:
M. B. O'DOGHERTY,
OTTO F. BARTHEL.